(12) United States Patent
Matsudaira et al.

(10) Patent No.: US 10,702,987 B2
(45) Date of Patent: Jul. 7, 2020

(54) ROBOT SYSTEM HAVING TEACH PENDANT COMMUNICATING WITH ROBOT CONTROLLER

(71) Applicant: FANUC CORPORATION, Yamanashi (JP)

(72) Inventors: Tetsuro Matsudaira, Yamanashi (JP); Syuntarou Toda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 218 days.

(21) Appl. No.: 15/700,302

(22) Filed: Sep. 11, 2017

(65) Prior Publication Data

US 2018/0071913 A1 Mar. 15, 2018

(30) Foreign Application Priority Data

Sep. 13, 2016 (JP) ................................. 2016-178839

(51) Int. Cl.
| | | |
|---|---|---|
| *B25J 9/00* | (2006.01) | |
| *B25J 9/16* | (2006.01) | |
| *B25J 13/00* | (2006.01) | |
| *G05B 19/409* | (2006.01) | |
| *B25J 13/06* | (2006.01) | |

(52) U.S. Cl.
CPC ............. *B25J 9/161* (2013.01); *B25J 9/0084* (2013.01); *B25J 9/163* (2013.01); *B25J 13/006* (2013.01); *B25J 13/06* (2013.01); *G05B 19/409* (2013.01); *Y10S 901/03* (2013.01)

(58) Field of Classification Search
CPC . B25J 9/0084; B25J 9/161; B25J 9/163; B25J 13/006; B25J 13/06; G05B 19/409; Y10S 901/03
See application file for complete search history.

(56) References Cited

U.S. PATENT DOCUMENTS

| | | | |
|---|---|---|---|
| 7,069,112 B2* | 6/2006 | Graf ....................... | B25J 9/1669 318/568.1 |
| 2004/0148058 A1* | 7/2004 | Johannessen ............ | B25J 13/06 700/245 |
| 2004/0257021 A1* | 12/2004 | Chang .................... | B25J 9/1669 318/568.21 |
| 2009/0299524 A1* | 12/2009 | Evans .................... | B25J 9/1656 700/248 |

(Continued)

FOREIGN PATENT DOCUMENTS

| | | |
|---|---|---|
| DE | 102010022258 A1 | 12/2010 |
| DE | 102013108114 A1 | 2/2015 |
| DE | 102014202145 A1 | 8/2015 |

(Continued)

*Primary Examiner* — Robert T Nguyen
(74) *Attorney, Agent, or Firm* — Hauptman Ham, LLP (57) ABSTRACT

A robot system having a communication established between a robot controller and a teach pendant. The robot system includes a robot; a detecting section for detecting a sign received by the robot; a robot controller for controlling the robot; a teach pendant capable of communicating with the robot controller and inputting an operational instruction for the robot into the robot controller; and an input permission section for permitting input of the operational instruction from the teach pendant into the robot controller when the sign is detected by the detecting section.

17 Claims, 10 Drawing Sheets

(56) References Cited

U.S. PATENT DOCUMENTS

2010/0161123 A1* 6/2010 Ando .................... B25J 9/1682
                                                        700/248

FOREIGN PATENT DOCUMENTS

| DE | 102015205176 B3 | 5/2016 |
| EP | 1522912 B1 | 9/2009 |
| JP | H5-57646 A | 3/1993 |
| JP | 2005-219147 A | 8/2005 |
| JP | 2006-277531 A | 10/2006 |
| JP | 2008-197856 A | 8/2008 |
| JP | 2012-171029 A | 9/2012 |
| JP | 2016-436 A | 1/2016 |
| WO | 2007/116624 A1 | 10/2007 |

* cited by examiner

ROBOT SYSTEM HAVING TEACH PENDANT COMMUNICATING WITH ROBOT CONTROLLER

RELATED APPLICATIONS

The present application claims priority to Japanese Patent Application No. 2016-178839 filed Sep. 13, 2016, the disclosure of which is hereby incorporated by reference herein in its entirety.

BACKGROUND OF THE INVENTION

1. Field of the Invention

The present invention relates to a robot system having a teach pendant communicating with a robot controller.

2. Description of the Related Art

A robot system including a robot controller for controlling a robot and a teach pendant used for inputting operational instructions for the robot (e.g., instructions of a teaching motion of the robot) into the robot controller, in which the controller and the pendant communicate with each other by wire or wirelessly, is known. In this type of robot system, it is necessary to establish communication between the robot controller and the teach pendant (i.e., to establish a state of intercommunication) without errors. For example, in a robot system in which operational instructions are delivered from a single teach pendant to a plurality of robots, it is desirable that the teach pendant communicates with a robot controller for controlling a robot to be operated, but does not communicate with a robot controller for controlling a robot that is not to be operated. Furthermore, each time an operational object of the teach pendant is changed from one robot to another robot, it is necessary to correctly shift a communication partner of the teach pendant from one robot controller to another robot controller.

For example, Japanese Unexamined Patent Publication No. 2006-277531 (JP2006-277531A) describes a robot system in which when a teach pendant is connected to one of a plurality of controllers, an indication lamp of a manipulator controlled by the connected controller is lighted, so as to enable a worker to easily confirm that the teach pendant has been correctly connected to the intended controller. Japanese Unexamined Patent Publication No. 2008-197856 (JP2008-197856A) discloses an automatic machine system in which a layout diagram of a plurality of automatic machines controlled by a plurality of controllers is displayed on a display of a teaching device that communicates with the controllers, so as to enable a worker to intuitively select a specific robot.

SUMMARY OF THE INVENTION

In a robot system including a robot controller and a teach pendant that are able to communicate with each other, it is necessary to enable communication to be established between the robot controller and the teach pendant without errors, and enable, in a configuration in which operational instructions are delivered to a plurality of robots from a single teach pendant, a communication partner of the teach pendant to be correctly shifted from one robot controller to another robot controller, each time an operational object of the teach pendant is changed from one robot to another robot.

One aspect of the present disclosure is a robot system including a robot; a detecting section configured to detect a sign received by the robot; a robot controller configured to control the robot; a teach pendant capable of communicating with the robot controller and inputting an operational instruction for the robot into the robot controller; and an input permission section configured to permit input of the operational instruction from the teach pendant into the robot controller when the sign is detected by the detecting section.

According to the above aspect of the robot system, when the robot to be operated by the teach pendant has received the sign, the operational instruction for the robot is permitted to be inputted by using the teach pendant into the robot controller for controlling the robot receiving the sign, whereby it is not necessary for an operator to enter a name or identification number of the robot into the teach pendant, and therefore it is possible to establish communication between the robot controller and the teach pendant without errors. Additionally, in a configuration in which operational instructions are delivered to a plurality of robots from a single teach pendant, it is possible to correctly shift a communication partner of the teach pendant from one robot controller to another robot controller, each time an operational object of the teach pendant is changed from one robot to another robot.

BRIEF DESCRIPTION OF THE DRAWINGS

The objects, features and advantages of the present invention will become more apparent from the following description of the embodiments in connection with the accompanying drawings, wherein.

DETAILED DESCRIPTION

Embodiments of the present disclosure will be described below with reference to the accompanying drawings. Throughout the drawings, corresponding components are denoted by common reference numerals.

Figure 1:
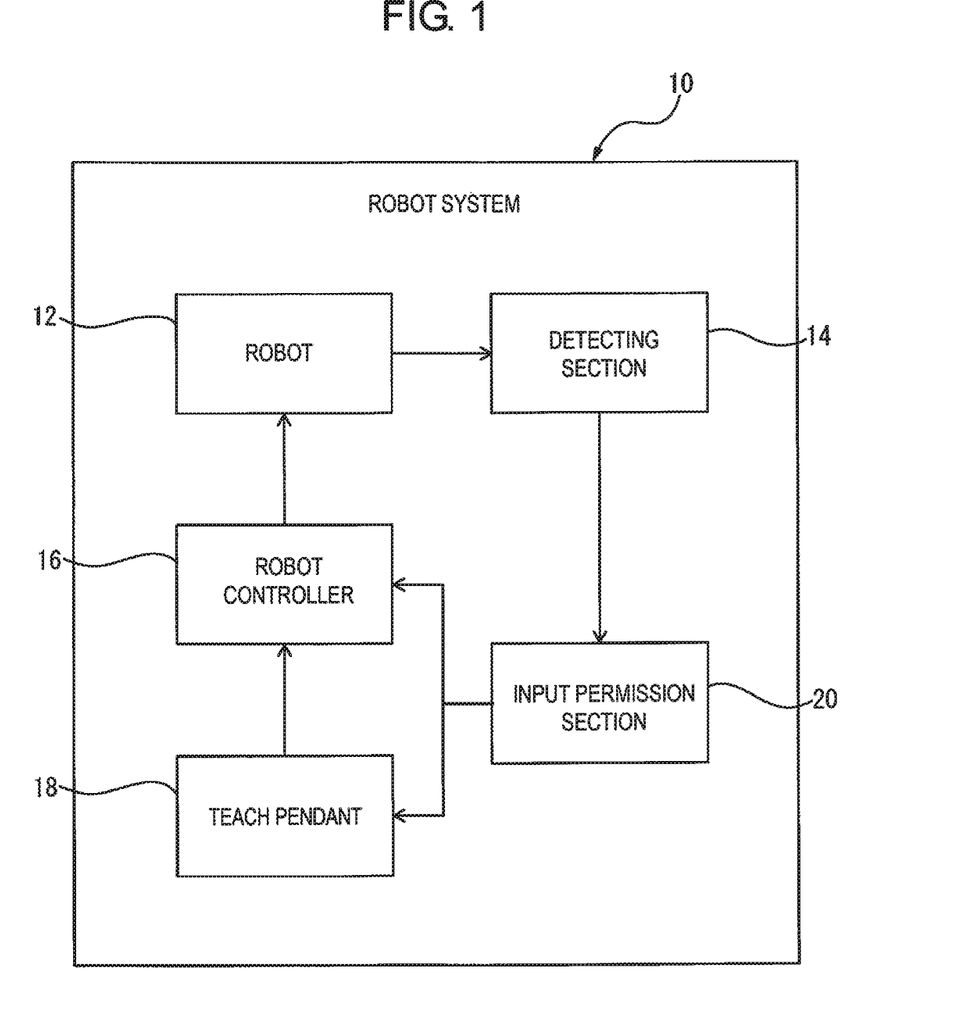
FIG. 1 is a functional block diagram illustrating a basic configuration of a robot system according to an embodiment.
Figure 2:
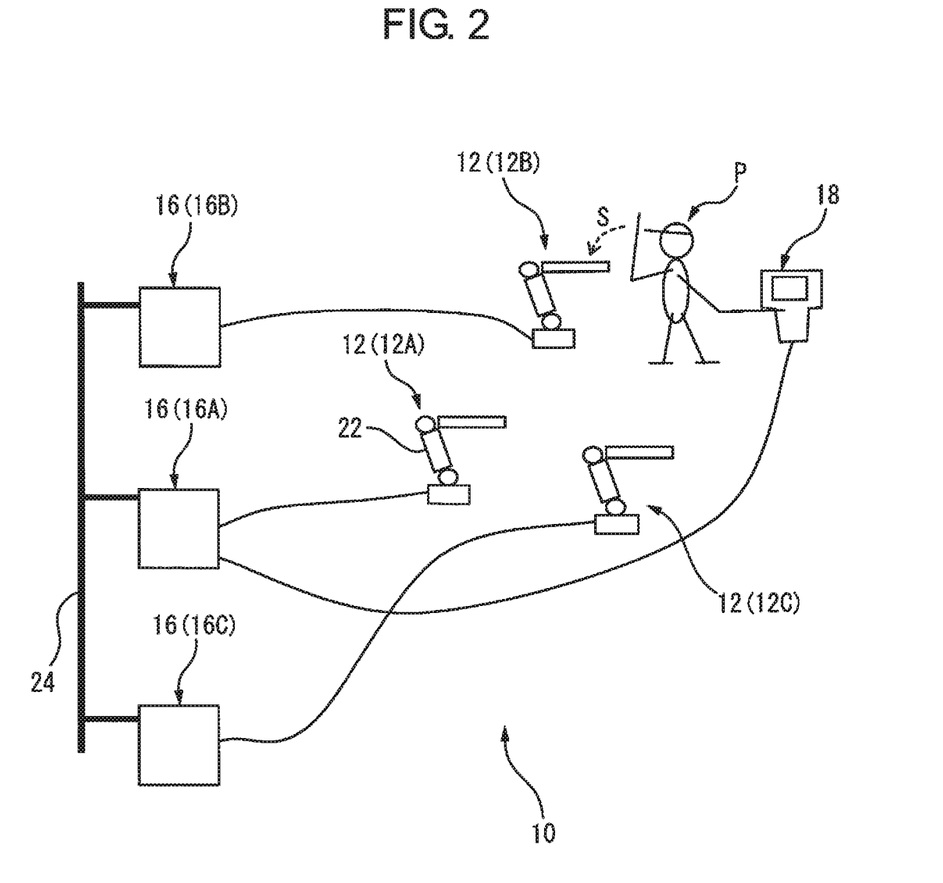
FIG. 2 is a diagram schematically illustrating an application example of a robot system.

FIG. 1 is a functional block diagram illustrating a basic configuration of a robot system 10 according to an embodiment. FIG. 2 schematically illustrates an application example of the robot system 10. The robot system 10 includes a robot 12; a detecting section 14 configured to detect a sign received by the robot 12; a robot controller 16 configured to control the robot 12; a teach pendant 18 capable of communicating with the robot controller 16 and capable of inputting an operational instruction for the robot 12 (e.g., an instruction of a teaching motion of the robot 12) into the robot controller 16; and an input permission section 20 configured to permit input of the operational instruction from the teach pendant 18 into the robot controller 16 when the sign is detected by the detecting section 14.

The robot 12 may include a mechanical part (i.e., a manipulator) selected as appropriate from various known types of mechanical parts, such as an articulated type, a gantry type, and a parallel-link type (FIG. 2 illustrates a vertical articulated type mechanical part 22). The detecting section 14 is configured to be able to detect in real time a sign given or transmitted to, for example, the mechanical part of the robot 12 from outside. A force, light, a signal (an electric signal, a magnetic signal, a sonic signal, etc.), visual information, etc., transmitted to the robot 12 from outside may be used as the sign. A force sensor, an acceleration sensor, a vibration sensor, an encoder, an optical sensor, a proximity sensor, a vision sensor, etc., capable of detecting the sign may be used as the detecting section 14. The detecting section 14 is also configured to be able to send a sign detection signal to the robot controller 16 when detecting the sign.

Regarding a force, for example, the action of a worker intentionally pushing or striking a mechanical part of the robot 12 may be used as the sign. The detecting section 14 may detect such a force by a force sensor, an acceleration sensor, a vibration sensor, etc., installed at a desired location on the mechanical part of the robot 12; by an encoder for detecting rotational angles of a plurality of control axes of the mechanical part; or by a circuit for monitoring current feedback values of drive motors of respective axes. Regarding light, for example, the action of a worker intentionally projecting light from an electric lamp, etc., onto the mechanical part of the robot 12 may be used as the sign. The detecting section 14 may detect such light by an optical sensor provided at a desired position of the mechanical part of the robot 12. Regarding a signal, for example, the action of a worker intentionally approaching the mechanical part of the robot 12 to cause some kind of signal may be used as the sign. The detecting section 14 may detect the signal indicating such an approaching motion, by an electric, magnetic, sonic or other type of proximity sensor, a mechanical switch, etc., provided at a desired position of the mechanical part of the robot 12. Regarding visual information, for example, the action of a worker intentionally performing a predetermined body motion in front of the mechanical part of the robot 12 may be used as the sign. The detecting section 14 may detect such a predetermined body motion by a vision sensor attached to the robot 12.

The robot controller 16 is configured to be able to control various operations relating to tasks executed by the robot 12, and to control not only operations of the respective axes of the mechanical part, but also operations of an end effector (not illustrated) attached to an end of the mechanical part. In the case where a force or a signal is used as the sign, collaborative control may be executed in order to ensure the safety of the worker. The collaborative control is known as, for example, a control strategy performed when an outside force is applied to the mechanical part of the robot 12, wherein a brake of a specific control axis is released to enable the control axis to move correspondingly to the outside force, or the outside force is detected and the respective axes are controlled so as to make the robot 12 move in a direction weakening the outside force.

The teach pendant 18 is a portable user-interface device usable by a worker for operating the robot 12, and includes input keys used for inputting operational instructions, a display screen for displaying the state of the robot 12, and the like. The teach pendant 18 is connected to the robot controller 16 by wire or wirelessly, and the robot controller 16 is able to receive operational instructions inputted by using the teach pendant 18. The input permission section 20 may be configured as a function (hardware and software) of a processor, and may be incorporated, for example, into a CPU of the robot controller 16 or a CPU of the teach pendant 18, or alternatively a CPU of a separate personal computer connected to the robot controller 16.

In the application example illustrated in FIG. 2, the robot system 10 includes a plurality of robot controllers 16, each controller configured to control a single robot 12, and a network 24 to which the robot controllers 16 are connected. The teach pendant 18 is configured to be able to communicate with any one of the robot controllers 16 so as to input or feed the operational instruction to one of the robot controllers 16. The detecting section 14 (FIG. 1) is provided for each of the plurality of robots 12, and is configured to be able to individually detect the sign received by each robot 12 and send a sign detection signal to the corresponding robot controller 16. The input permission section 20 (FIG. 1) is configured to be able to specify the robot 12, for which the sign is detected by the detecting section 14, among the plurality of robots 12, and permit the operational instruction for the specified robot 12 to be inputted by using the teach pendant 18 into the robot controller 16 controlling the specified robot 12.

FIG. 2 illustrates a situation in which the teach pendant 18 is connected by wire to a robot controller 16A controlling a robot 12A, and is used for inputting an operational instruction into a robot controller 16B controlling a robot 12B through the network 24. In the situation illustrated in FIG. 2, it is necessary to establish communication between the teach pendant 18 and the robot controller 16B (i.e., to establish a state of intercommunication) in order for an operator P of the teach pendant 18 to operate the robot 12B. In this instance, if the teach pendant 18 erroneously communicates with the other robot controller 16A or 16C, the operator P is not able to operate the intended robot 12B and unintended robot 12A or 12C inadvertently moves. Conventionally, when communication is established between a teach pendant and a robot controller, an operator enters, for example, a name or identification number (e.g., an IP address) of a robot into the teach pendant, but it is difficult to completely prevent erroneous entries.

In the robot system 10, when starting an operation of the robot 12B using the teach pendant 18, the operator P (or another worker) intentionally give a sign S to the robot 12B to be operated (e.g., the operator pushes or strikes the mechanical part 22 of the robot 12B). The detecting section 14 (FIG. 1) detects the sign S received by the robot 12B and sends a sign detection signal to the robot controller 16B. Then, on the basis of the fact that, for example, the robot controller 16B has received the sign detection signal, the input permission section 20 (FIG. 1) specifies the robot 12B, for which the sign S is detected by the detecting section 14, among the plurality of robots 12A to 12C, and permits the operational instruction for the specified robot 12B to be inputted by using the teach pendant 18 into the robot controller 16B. On the other hand, the input permission section 20 does not permit the operational instruction for the other robot 12A or 12C, for which the sign S is not detected by the detecting section 14, to be inputted by using the teach pendant 18 into the robot controller 16A or 16C. As a result, the communication is established between the robot controller 16B and the teach pendant 18 without errors.

According to the robot system 10 having the above configuration, when the robot 12 to be operated by the teach pendant 18 has received the sign S, the operational instruction for the robot 12 is permitted to be inputted by using the teach pendant 18 into the robot controller 16 for controlling the robot 12 receiving the sign S, whereby it is not necessary for the operator P to enter a name or identification number (e.g., an IP address) of the robot 12 into the teach pendant 18, which completely eliminates probability of the aforementioned erroneous entry, and therefore it is possible to establish the communication between the robot controller 16 and the teach pendant 18 without errors. Additionally, in a configuration in which operational instructions are delivered to a plurality of robots 12A to 12C from a single teach pendant 18, when the operational object of the teach pendant 18 is changed from the robot 12C to the robot 12B, for example, it is possible to correctly shift the communication partner of the teach pendant 18 from the robot controller 16C to the robot controller 16B.

Figure 3:
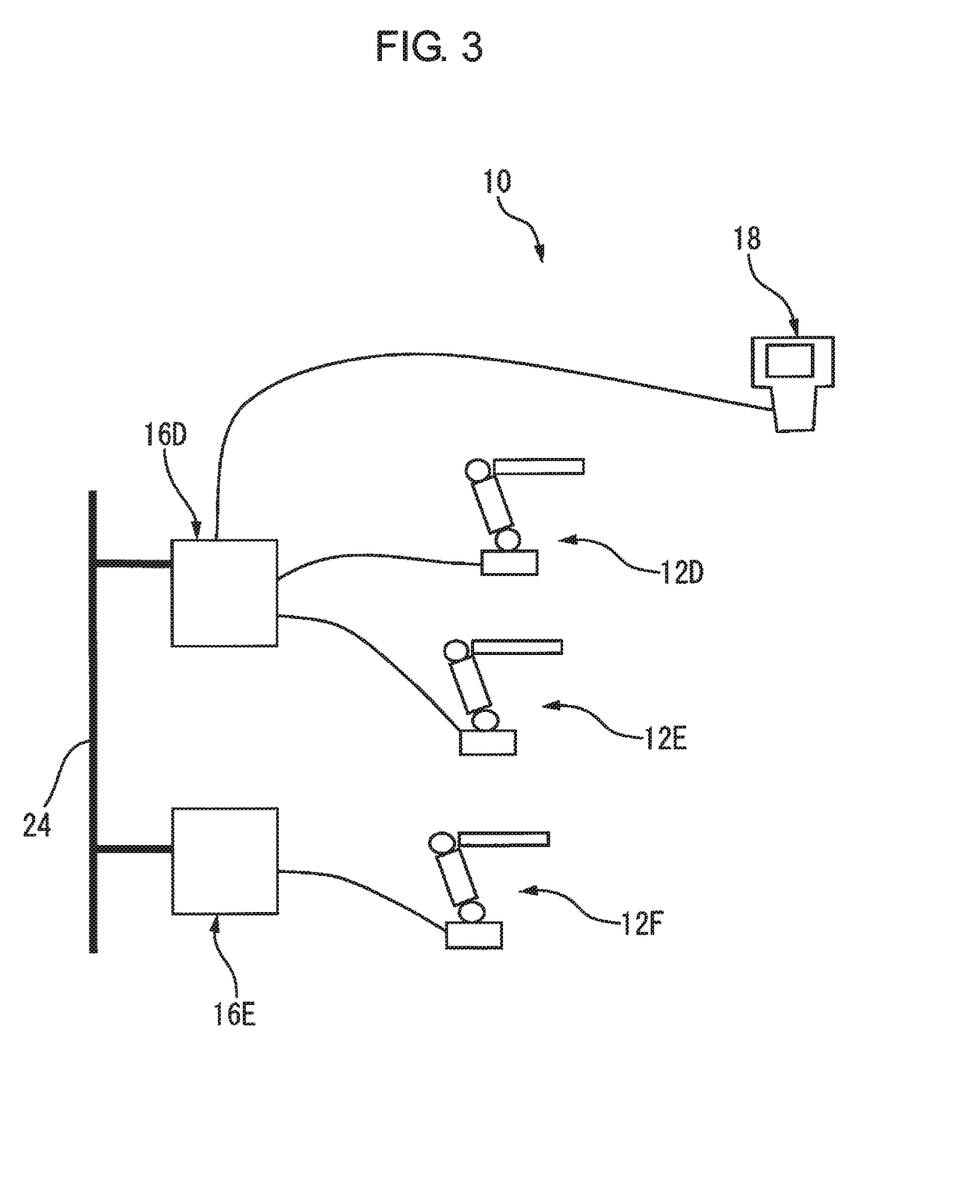
FIG. 3 is a diagram schematically illustrating another application example of a robot system.

FIG. 3 schematically illustrates another application example of the robot system 10. In the application example illustrated in FIG. 3, the robot system 10 includes a robot controller 16D configured to control two robots 12D and 12E, a robot controller 16E configured to control a single robot 12F, and a network 24 to which the robot controllers 16D and 16E are connected. The teach pendant 18 is connected by wire to the robot controller 16D, and is configured to be able to communicate with either one of the robot controllers 16D and 16E so as to input or feed the operational instruction to one of the robot controllers 16D and 16E. The detecting section 14 (FIG. 1) is provided for each of the robots 12D-12F, and is configured to be able to individually detect the sign received by each robot 12D-12F. The input permission section 20 (FIG. 1) is configured to be able to specify the robot 12D-12F, for which the sign is detected by the detecting sections 14, among the plurality of robots 12D-12F, and permit the operational instruction for the specified robot 12D-12F to be inputted by using the teach pendant 18 into the robot controller 16D-16E controlling the specified robot 12D-12F.

Figure 4:
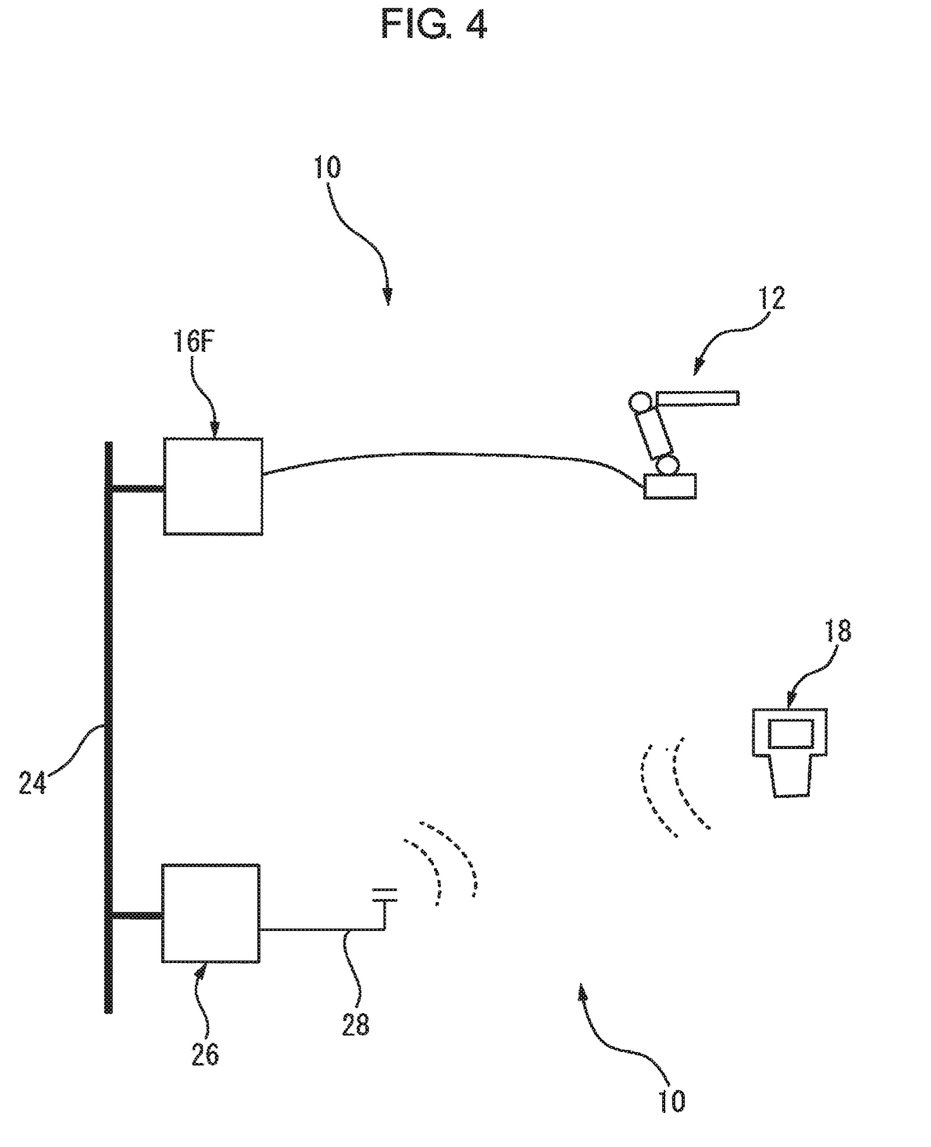
FIG. 4 is a diagram schematically illustrating yet another application example of a robot system.

FIG. 4 schematically illustrates yet another application example of the robot system 10. In the application example illustrated in FIG. 4, the robot system 10 includes a robot controller 16F configured to control a single robot 12, a network 24 to which the robot controller 16F is connected, and a network controller 26 configured to control the network 24. The teach pendant 18 is connected wirelessly to the network controller 26 via an antenna 28, and is configured to be able to communicate with the network controller 26 so as to input or feed the operational instruction to the robot controller 16F. Note that the robot system 10 may be applied to a system configuration in which the configurations of FIGS. 2 to 4 are combined as appropriate, and may be applied to a system configuration including at least a single robot 12 and a single robot controller 16. The same effects as those described above are achievable by any of the application examples.

Figure 5:
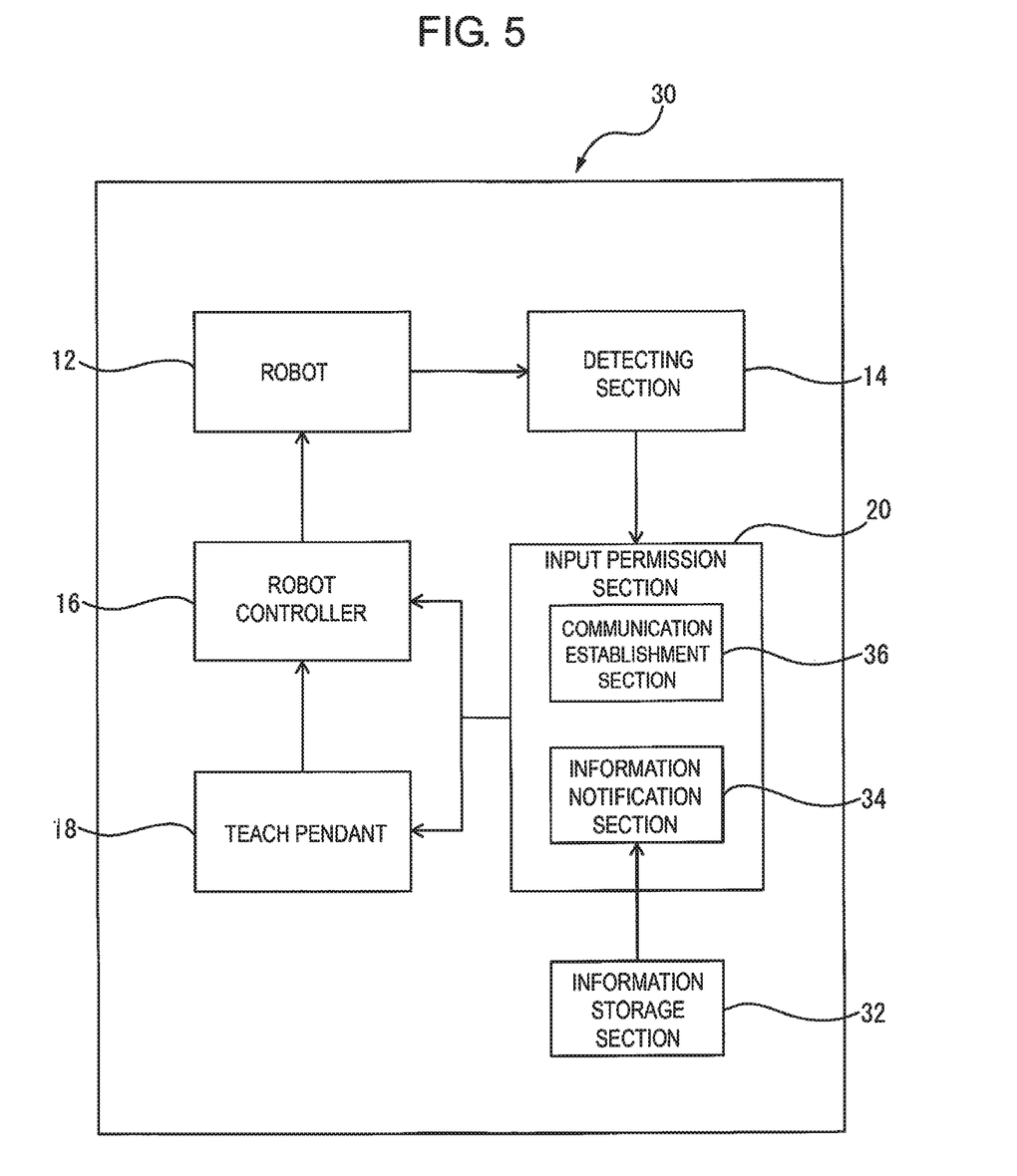
FIG. 5 is a functional block diagram illustrating a configuration example of a robot system.

FIG. 5 is a functional block diagram illustrating a configuration of a robot system 30 including an input permission section 20 having an exemplary input-permission function. The robot system 30 is a specific configuration example having the basic configuration of the aforementioned robot system 10, and corresponding components are denoted by the same reference numerals while detailed descriptions thereof are not repeated. The robot system 30 may be applied to various system configurations analogously to the robot system 10.

The robot system 30 includes an information storage section 32 storing controller identification information for identifying a robot controller 16. The information storage section 32 may be configured as, for example, a memory provided in the robot controller 16 or an external storage unit provided for the robot controller 16. The controller identification information may be represented by a unique code, such as an IP address, assigned to the robot controller 16 in advance.

The input permission section 20 includes an information notification section 34 configured to extract, from the information storage section 32, the controller identification information corresponding to the robot controller 16 for controlling a robot 12 receiving a sign and notify a teach pendant 18 of the extracted controller identification information, when the sign is detected by a detecting section 14; and a communication establishment section 36 configured to establish communication usable for the input of an operational instruction for the robot 12 receiving the sign into the robot controller 16, between the teach pendant 18 notified of the controller identification information and the robot controller 16 for controlling the robot 12 receiving the sign.

According to the robot system 30 having the above configuration, when the robot 12 to be operated by the teach pendant 18 has received the sign S, the teach pendant 18 is notified of the controller identification information of the robot controller 16 for controlling the robot 12 receiving the sign S and the communication is thus established between the robot controller 16 and the teach pendant 18, and therefore it is possible to improve the reliability of communication establishment.

In the case where the above robot system 30 is applied to the system configuration illustrated in FIG. 3, the information storage section 32 may further store robot identification information for identifying the robot 12. In the system configuration illustrated in FIG. 3, the robot controller 16D for controlling two robots 12D and 12E is configured to individually control the two robots 12D and 12E by, for example, assigning axis numbers to the plurality of control axes of each of the robots 12D and 12E. The robot identification information may be represented by, for example, the axis numbers of the control axes (e.g., axis numbers 1-6 indicate the robot 12D and axis numbers 7-12 indicate the robot 12E), or grouped axis number (e.g., a group A indicates axis numbers 1-6 (i.e., the robot 12D) and a group B indicates axis numbers 7-12 (i.e., the robot 12E)).

In the case where the robot system 30 is applied to the system configuration illustrated in FIG. 3, the information notification section 34 is configured to extract, from the information storage section 32, the robot identification information corresponding to the robot 12 receiving the sign and notify the teach pendant 18 of the extracted robot identification information, in addition to the controller identification information, when the sign is detected by the detecting section 14. The communication establishment section 36 is configured to establish communication usable for the input of an operational instruction for the robot 12 receiving the sign into the robot controller 16, between the teach pendant 18 notified of both of the controller identification information and the robot identification information and the robot controller 16 for controlling the robot 12 receiving the sign.

Figure 6A:
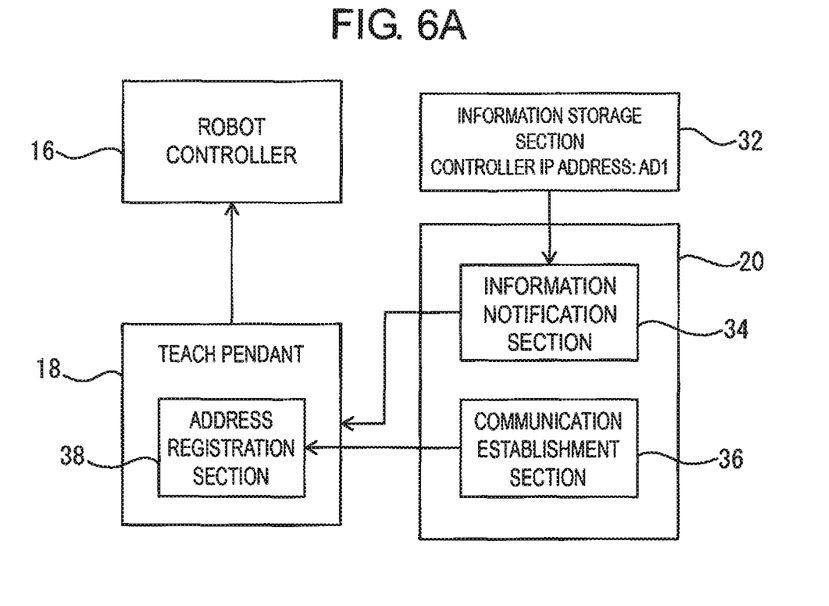
FIG. 6A is a functional block diagram illustrating an example of a communication establishment procedure in the robot system illustrated in FIG. 5.

FIG. 6A illustrates, as a functional block diagram, an example of a communication establishment procedure carried out in the robot system 30. In the illustrated example, the teach pendant 18 includes an address registration section 38 provided for identification of a partner of communication with use of an IP address. The information storage section 32 is configured to store, as the controller identification information, a controller IP address AD1 assigned to the robot controller 16 in advance. The communication establishment section 36 is configured to register the controller IP address AD1, notified by the information notification section 34 to the teach pendant 18, in the address registration section 38 to establish the aforementioned communication.

For example, in the case where the robot system 30 is applied to the system configuration illustrated in FIG. 2, the information storage section 32 is provided to each of the robot controllers 16A to 16C, and is configured to store the controller IP address AD1 (AD1-A, AD1-B or AD1-C) of the corresponding robot controller 16A-16C. When the operational object of the teach pendant 18 changes from the robot 12C to the robot 12B, an operator P (or another worker) intentionally give a sign S to the robot 12B, and the detecting section 14 (FIG. 1) detects the sign S received by the robot 12B and sends a sign detection signal to the robot controller 16B, as described above. When the robot controller 16B receives the sign detection signal, the information notification section 34 extracts the controller IP address AD1-B of the robot controller 16B from the information storage section 32 provided to the robot controller 16B, and sends (or notifies) the extracted controller IP address AD1-B to the teach pendant 18 via the network 24 and the robot controller 16C. The communication establishment section 36 overwrites or replaces the controller IP address AD1-C of the robot controller 16C registered in the address registration section 38 of the teach pendant 18 with the controller IP address AD1-B of the robot controller 16B notified to the teach pendant 18 by the information notification section 34. As a result of this overwriting process, the communication previously established between the teach pendant 18 and the robot controller 16C is cut off, and the aforementioned communication is newly established between the teach pendant 18 and the robot controller 16B. Note that just after the information notification section 34 notifies the teach pendant 18 of the controller IP address AD1-B of the robot controller 16B, the communication establishment section 36 may also intentionally delete the previously-registered controller IP address AD1-C of the robot controller 16C, before registering the controller IP address AD1-B in the address registration section 38.

The robot system 30 illustrated in FIG. 5 may have a following modified configuration. The modified robot system 30 includes an information storage section 32 storing pendant identification information for identifying the teach pendant 18. The input permission section 20 includes an information notification section 34 configured to extract the pendant identification information from the information storage section 32 and notify the robot controller 16 for controlling the robot 12 receiving the sign of the extracted pendant identification information, when the sign is detected by the detecting section 14; and a communication establishment section 36 configured to establish communication usable for the input of the operational instruction for the robot 12 receiving the sign into the robot controller 16, between the robot controller 16 notified of the pendant identification information and the teach pendant 18.

In the above modified robot system 30, when the robot 12 to be operated by the teach pendant 18 has received the sign S, the robot controller 16 for controlling the robot 12 receiving the sign is notified of the pendant identification information of the teach pendant 18 and the communication is thus established between the robot controller 16 and the teach pendant 18, and therefore it is possible to improve the reliability of communication establishment.

Figure 6B:
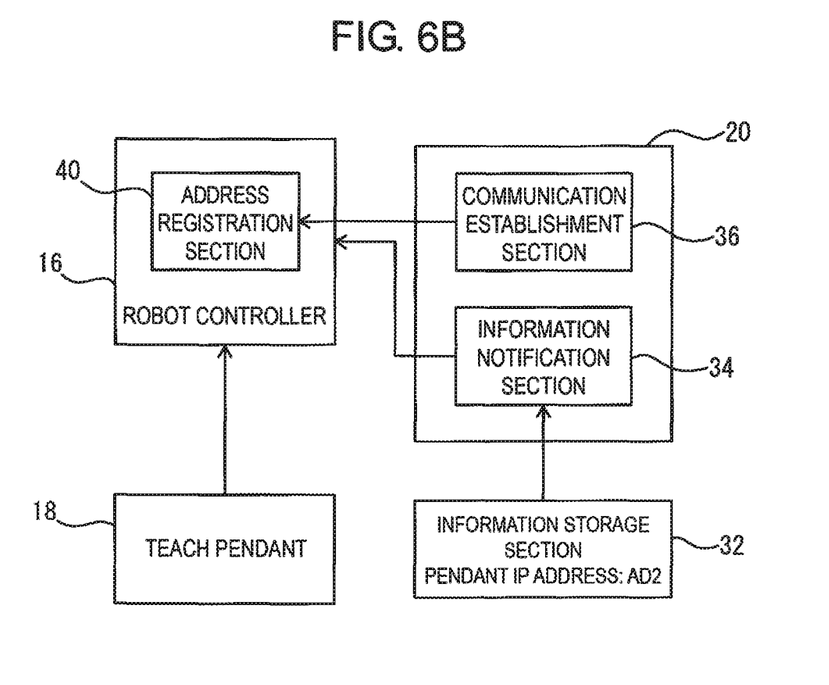
FIG. 6B is a functional block diagram illustrating another example of a communication establishment procedure in the robot system illustrated in FIG. 5.

FIG. 6B illustrates, as a functional block diagram, an example of a communication establishment procedure carried out in the above modified robot system 30. In the illustrated example, the robot controller 16 includes an address registration section 40 provided for identification of a partner of communication with use of an IP address. The information storage section 32 is configured to store, as the pendant identification information, a pendant IP address AD2 assigned to the teach pendant 18 in advance. The communication establishment section 36 is configured to register the pendant IP address AD2, notified by the information notification section 34 to the robot controller 16, in the address registration section 40 to establish the aforementioned communication.

For example, in the case where the above modified robot system 30 is applied to the system configuration illustrated in FIG. 2, the information storage section 32 is provided to each of the robot controllers 16A to 16C, and either information storage section 32 is configured to store the pendant IP address AD2 of the teach pendant 18 in conjunction with the address registration section 40 of each robot controller 16A-16C. When the operational object of the teach pendant 18 changes from the robot 12C to the robot 12B, an operator P (or another worker) intentionally give a sign S to the robot 12B, and the detecting section 14 (FIG. 1) detects the sign S received by the robot 12B and sends a sign detection signal to the robot controller 16B, as described above. When the robot controller 16B receives the sign detection signal, the information notification section 34 extracts the pendant IP address AD2 of the teach pendant 18 from the information storage section 32 provided to the robot controller 16C, and sends (or notifies) the extracted pendant IP address AD2 to the robot controller 16B via the network 24. The communication establishment section 36 registers, in the address registration section 40 of the robot controller 16B, the pendant IP address AD2 of the teach pendant 18 notified by the information notification section 34 to the robot controller 16B, and at the same time, nullifies (e.g., by data-erasing) both of the information storage section 32 provided to the robot controller 16C and the address registration section 40 of the robot controller 16C. The pendant IP address AD2 registered in the address registration section 40 of the robot controller 16B is stored in the information storage section 32 provided to the robot controller 16B. As a result of this transferring process of the pendant IP address AD2, the communication previously established between the teach pendant 18 and the robot controller 16C is cut off, and the aforementioned communication is newly established between the teach pendant 18 and the robot controller 16B.

Figure 7:
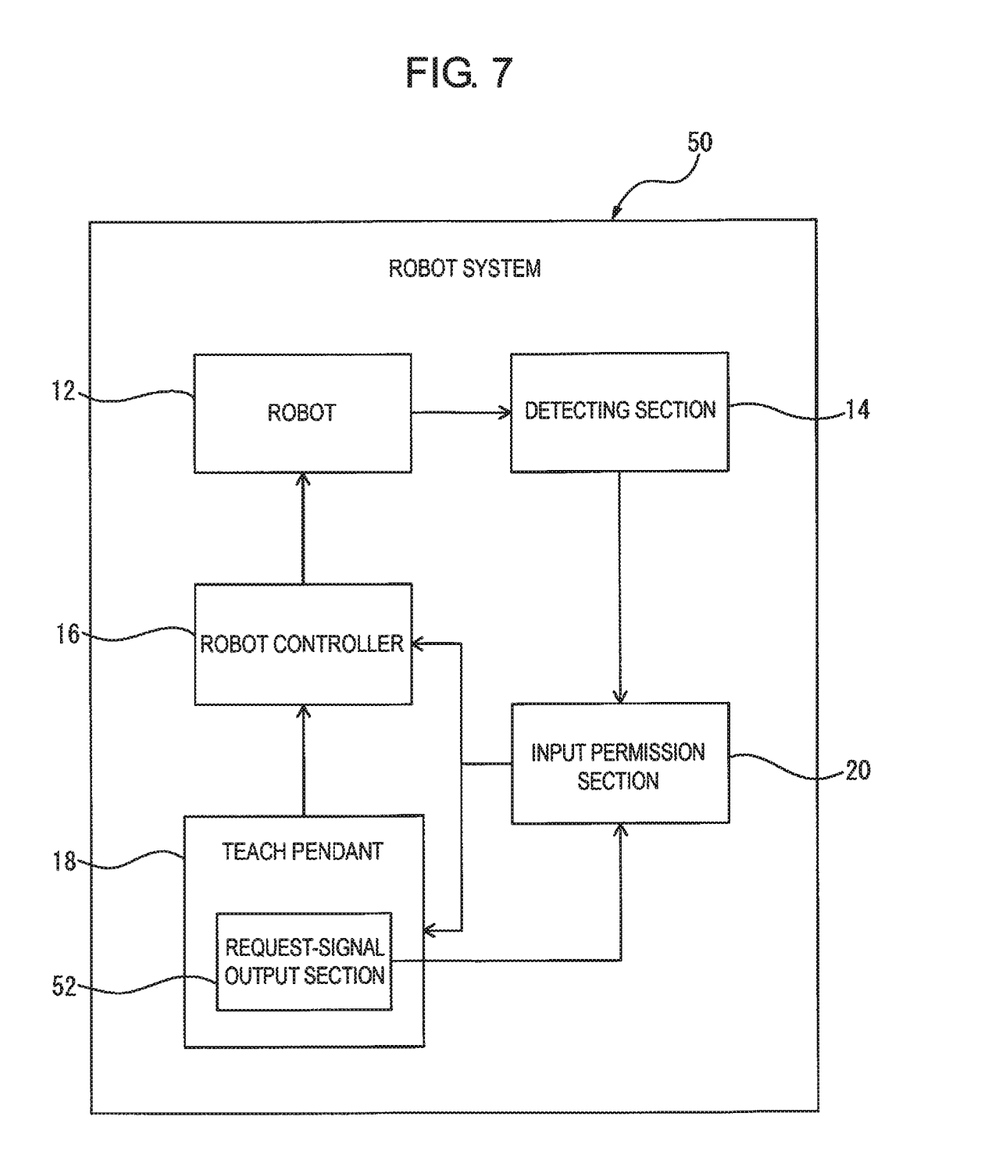
FIG. 7 is a functional block diagram illustrating another configuration example of a robot system.

FIG. 7 is a functional block diagram illustrating a configuration of a robot system 50 including a teach pendant 18 having an exemplary input-permission requesting function. The robot system 50 is a specific configuration example having the basic configuration of the aforementioned robot system 10, and corresponding components are denoted by the same reference numerals while detailed descriptions thereof are not repeated. The input-permission requesting function of the robot system 50 may also be added to the aforementioned robot system 30. Further, the robot system 50 may be applied to various system configurations analogously to the robot system 10.

In the robot system 50, the teach pendant 18 includes a request-signal output section 52 configured to output a request signal requesting permission for the input of an operational instruction into a robot controller 16. The request-signal output section 52 may output the request signal when, for example, an operator of the teach pendant 18 continues to push a specific input key of the teach pendant 18, or enters a specific instruction, different from the operational instruction for the robot 12, into the teach pendant 18. The robot controller 16 is configured to be able to receive the request signal outputted from the request-signal output section 52, independently of the operational instruction inputted by using the teach pendant 18. The input permission section 20 is configured to permit the input of the operational instruction by using the teach pendant 18 into the robot controller 16 for controlling the robot 12 receiving a sign, when the request signal is being outputted from the request-signal output section 52. On the other hand, the input permission section 20 does not permit the input of the operational instruction by using the teach pendant 18 into the robot controller 16, when the request signal is not being outputted from the request-signal output section 52.

In the robot system 50 having the above configuration, the operational instruction is allowed to be inputted into the robot controller 16 from the teach pendant 18 when the request signal is being outputted from the request-signal output section 52. Accordingly, even if, for example, the detecting section 14 detects some kind of sign when it is not necessary to establish communication between the robot controller 16 and the teach pendant 18 (and thus the request signal is not being outputted from the teach pendant 18), the input permission section 20 does not permit an input from the teach pendant 18, and therefore it is possible to prevent unintended communication from being established.

Figure 8:
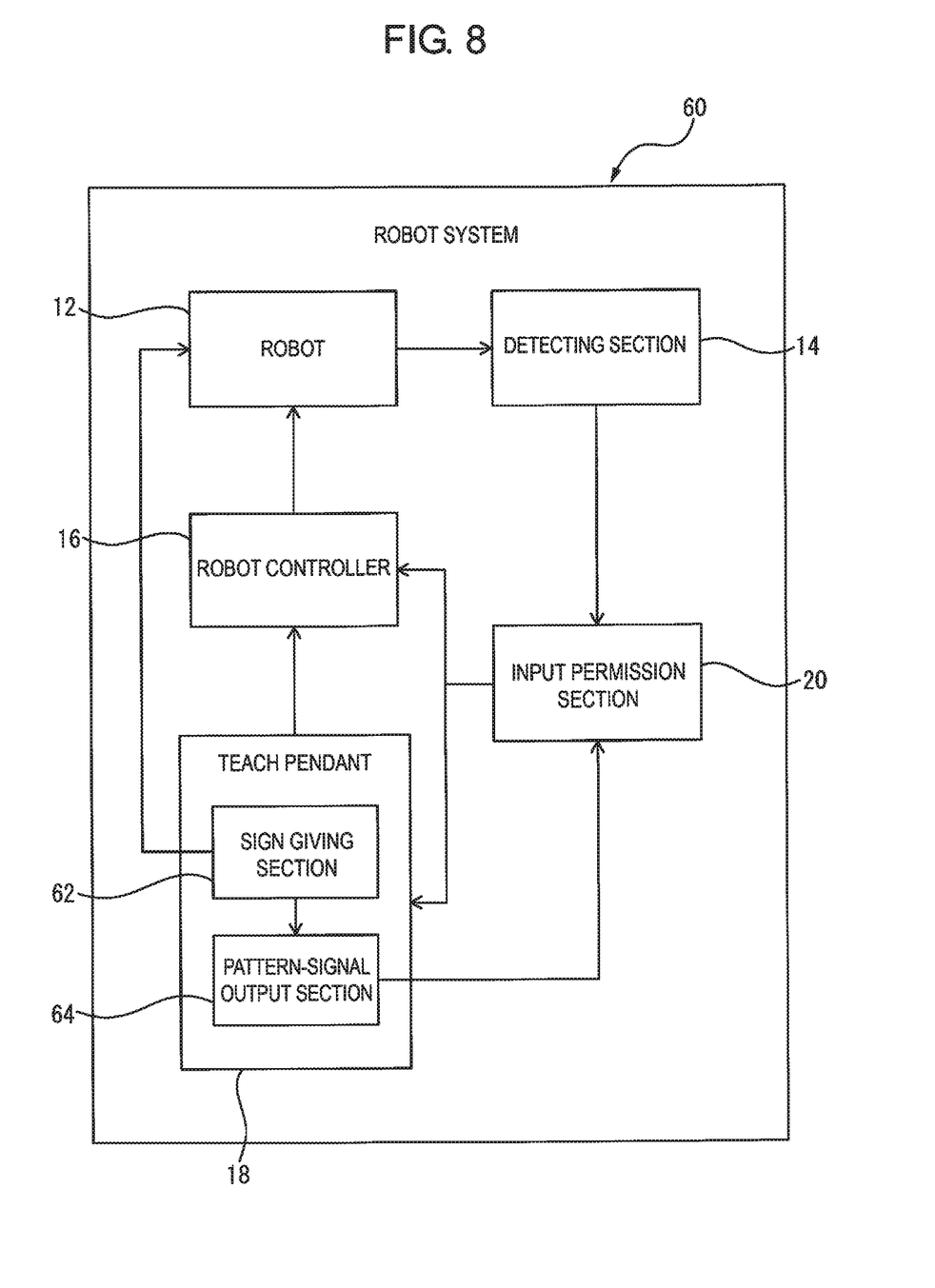
FIG. 8 is a functional block diagram illustrating yet another configuration example of a robot system.
Figure 9:
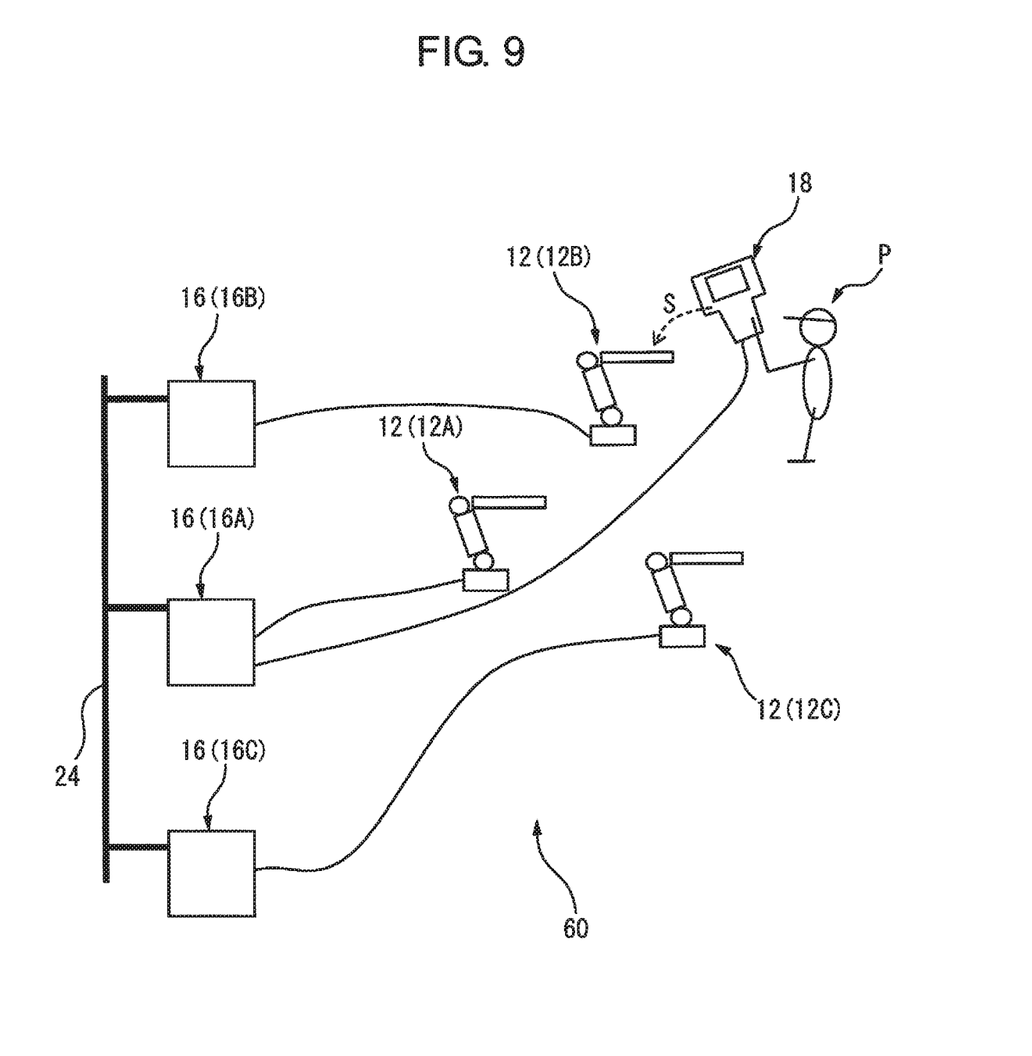
FIG. 9 is a diagram schematically illustrating yet another application example of a robot system.

FIG. 8 is a functional block diagram illustrating a configuration of a robot system 60 including a teach pendant 18 having another exemplary input-permission requesting function. FIG. 9 schematically illustrates an application example of the robot system 60. The robot system 60 is a specific configuration example having the basic configuration of the aforementioned robot system 10, and corresponding components are denoted by the same reference numerals while detailed descriptions thereof are not repeated. The input-permission requesting function of the robot system 60 may also be added to the aforementioned robot system 30 or 50. Further, the robot system 60 may be applied to various system configurations analogously to the robot system 10.

In the robot system 60, the teach pendant 18 includes a sign giving section 62 capable of giving a sign to the robot 12, and a pattern-signal output section 64 configured to output a pattern signal of the sign given by the sign giving section 62 to the robot 12. For example, in the case where a force applied to the robot 12 from outside is used as the sign, the sign giving section 62 may be formed as a housing of the teach pendant 18, and may give the sign to the robot 12 when an operator directly pushes or strikes the robot 12 by the housing of the teach pendant 18 (see FIG. 9). In this case, the teach pendant 18 may incorporate therein a vibration sensor or an acceleration sensor, and the pattern-signal output section 64 may output a signal converted from a pattern of signs detected by the vibration or acceleration sensor (e.g., a pattern of vibration caused by the pushing or striking motion of the housing). In the case where light given to the robot 12 from outside is used as the sign, the teach pendant 18 may incorporate therein a light projector as the sign giving section 62. The pattern-signal output section 64 may output a signal converted from a pattern of the light projected by the projector.

The robot controller 16 is configured to be able to receive the pattern signal outputted from the pattern-signal output section 64, independently of the operational instruction inputted by using the teach pendant 18. The input permission section 20 is configured to collate the pattern of the sign detected by the detecting section 14 with the pattern signal outputted from the pattern-signal output section 64, and when the detected sign pattern coincides with the pattern signal, permit the input of the operational instruction by using the teach pendant 18 into the robot controller 16 for controlling the robot 12 receiving the sign. On the other hand, the input permission section 20 does not permit the input of the operational instruction by using the teach pendant 18 into the robot controller 16, when the pattern of the sign detected by the detecting section 14 does not coincide with the pattern signal outputted from the pattern-signal output section 64.

In the robot system 60 having the above configuration, the operational instruction is allowed to be inputted into the robot controller 16 from the teach pendant 18 when the pattern of the sign actually detected by the detecting section 14 coincides with the pattern of the sign given from the teach pendant 18 to the robot 12. Accordingly, even in the case where, for example, the detecting section 14 detects some kind of sign when it is not necessary to establish communication between the robot controller 16 and the teach pendant 18 (and thus the pattern signal is not being outputted from the teach pendant 18), or the detecting section detects that another robot 12, different from the robot 12 to be controlled, receives some kind of sign (e.g., a sign having a pattern different from the pattern signal outputted from the teach pendant 18), the input permission section 20 does not permit an input from the teach pendant 18, and therefore it is possible to prevent unintended communication from being established.

Figure 10:
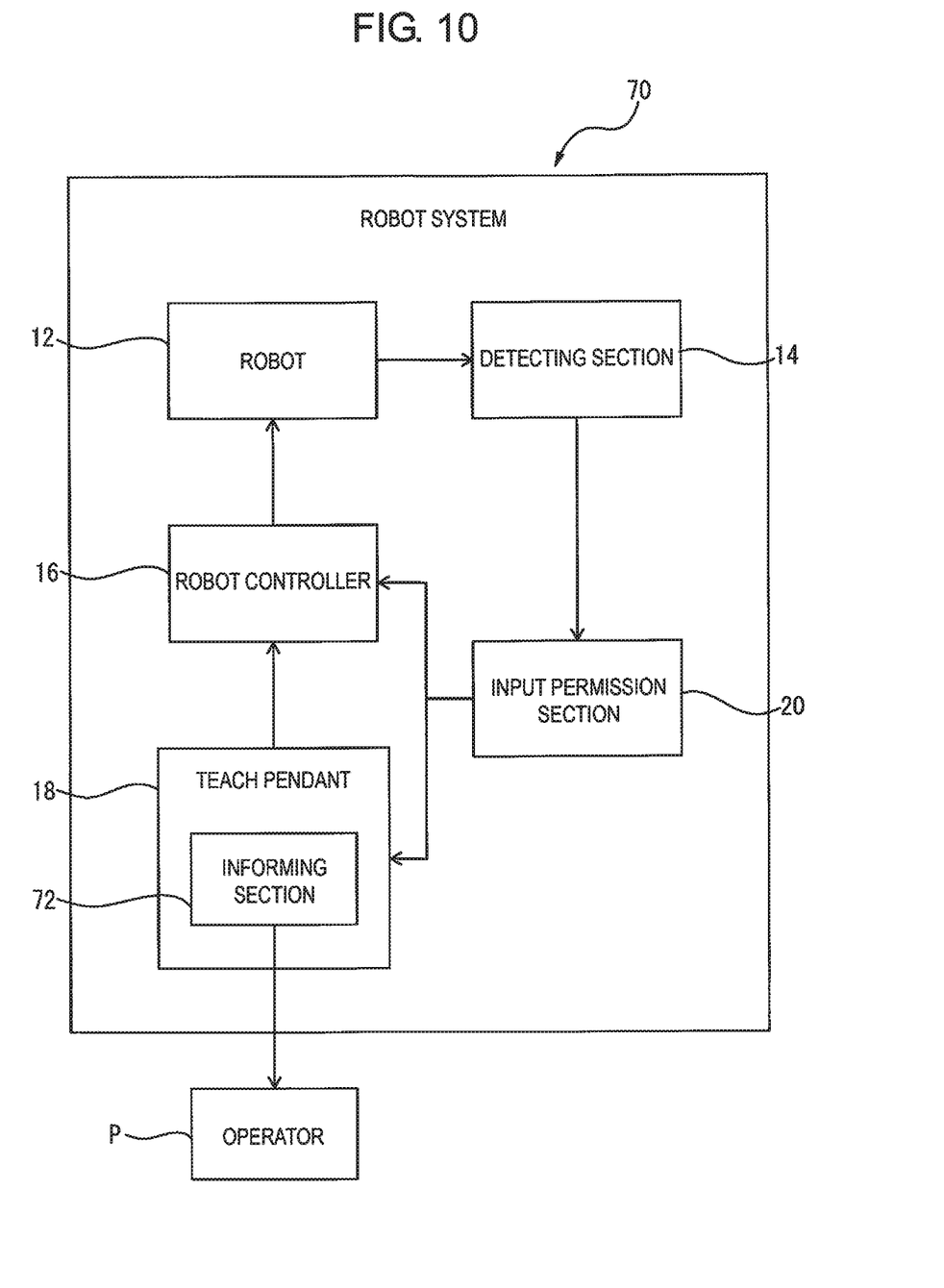
FIG. 10 is a functional block diagram illustrating yet another configuration example of a robot system.

FIG. 10 is a functional block diagram illustrating a configuration of a robot system 70 including a teach pendant 18 having an exemplary input-permission informing function. The robot system 70 is a specific configuration example having the basic configuration of the aforementioned robot system 10, and corresponding components are denoted by the same reference numerals while detailed descriptions thereof are not repeated. The input-permission informing function of the robot system 70 may also be added to the aforementioned robot systems 30, 50 or 60. Further, the robot system 70 may be applied to various system configurations analogously to the robot system 10.

In the robot system 70, a teach pendant 18 includes an informing section 72 configured to inform, to an operator P, that an input permission section 20 has permitted an operational instruction to be inputted into a robot controller 16 by using the teach pendant 18. The informing section 72 may be configured as a display screen, an oscillator, a buzzer, etc., incorporated in the teach pendant 18, and may inform to the operator P that the input permission section 20 has permitted the input with use of a display image, vibration, sound, etc. The operator P is able to sense the display image, the vibration, the sound, etc., outputted from the teach pendant 18, and thereby intuitively recognize that the input permission section 20 has permitted the input.

In the case where the robot system 70 is applied to a system configuration including a plurality of robots 12, such as that illustrated in FIG. 2, the informing section 72 may be configured to inform, to the operator, the robot controller 16 for which the input of the operational instruction by using the teach pendant 18 has been permitted, with use of sensory information perceivable by the operator P and corresponding individually to each of the plurality of robots 12. For example, in the case where the informing section 72 informs an input permission by the input permission section 20 through an image display, the provision of input permission images, set in advance to correspond respectively to the robot controllers 16 (e.g., set as an image expressing the identification information of the robot controller 16), may enable the operator P to see the input permission image and thereby confirm whether or not the communication has been correctly established between the intended robot controller 16 and the teach pendant 18. In the case where the informing section 72 informs an input permission by the input permission section 20 through vibration or a sound, the provision of vibration patterns, tone/sound patterns, etc., set in advance to correspond respectively to the robot controllers 16, may enable the operator P to perceive the vibration or sound and thereby confirm whether or not the communication has been correctly established between the intended robot controller 16 and the teach pendant 18.

While the invention has been described with reference to specific embodiments, it will be understood, by those skilled in the art, that various changes or modifications may be made thereto without departing from the scope of the following claims.

The invention claimed is:

1. A robot system, comprising:
   a robot;
   a sensor configured to detect a sign received by the robot;
   a robot controller configured to control the robot;
   a teach pendant configured to
     communicate with the robot controller, and
     input an operational instruction for the robot into the robot controller; and
   a processor configured to permit input of the operational instruction from the teach pendant into the robot controller in response to the sensor detecting the sign, wherein
   the sensor is configured to detect, as the sign given from outside to the robot, at least one of
     a force applied from outside to the robot,
     a signal indicating a motion approaching the robot, or
     visual information indicating a predetermined body motion.

2. The robot system of claim 1, comprising a plurality of robots, wherein
   the sensor is configured to individually detect the sign received by each of the plurality of robots, and
   the processor is further configured to specify a robot, for which the sign is detected by the sensor, among the plurality of robots, and permit the input of the operational instruction for the specified robot.

3. The robot system of claim 1, wherein
   the teach pendant is configured to output a request signal requesting permission for the input of the operational instruction into the robot controller; and
   the processor is configured to permit the input of the operational instruction into the robot controller in response to the request signal from the teach pendant.

4. The robot system of claim 1, wherein
   the teach pendant is configured to output a pattern signal of the sign given to the robot, and
   the processor is configured to
     obtain a pattern of the sign detected by the sensor, and
     permit the input of the operational instruction into the robot controller in response to a coincidence of the pattern of the sign with the pattern signal outputted from the teach pendant.

5. The robot system of claim 1, wherein the teach pendant is configured to inform, to an operator, that the processor has permitted the input of the operational instruction into the robot controller.

6. The robot system of claim 5, comprising a plurality of robots, wherein
   the teach pendant is configured to inform, to the operator, the robot controller for which the input has been permitted, with use of sensory information perceivable by the operator and corresponding individually to each of the plurality of robots.

7. The robot system of claim 1, wherein
   the force includes an action of an operator pushing or striking a mechanical part of the robot,
   the signal includes a signal caused by an action of the operator approaching the mechanical part of the robot, and
   the visual information includes an action of the operator performing the predetermined body motion in front of the mechanical part of the robot.

8. The robot system of claim 7, wherein
   the sensor is configured to detect the force applied from outside to the robot, and includes
     a force sensor, an acceleration sensor, or a vibration sensor installed on the mechanical part of the robot, or
     an encoder configured to detect rotational angles of a plurality of control axes of the mechanical part, or
     a circuit configured to monitor current feedback values of drive motors of the respective control axes.

9. The robot system of claim 7, wherein
   the sensor is configured to detect the signal indicating the motion approaching the robot, and includes an electric, magnetic, sonic or proximity sensor, or a mechanical switch, provided at the mechanical part of the robot.

10. The robot system of claim 7, wherein
    the sensor is configured to detect the predetermined body motion, and includes a vision sensor attached to the robot.

11. A robot system, comprising:
    a plurality of robots;
    a sensor configured to detect a sign received by one or more of the plurality of robots;
    a plurality of robot controllers, each robot controller configured to control at least one robot among the plurality of robots;
    a network to which the plurality of robot controllers are connected;
    a teach pendant configured to
      communicate with any one of the plurality of robot controllers, and
      input an operational instruction into any one of the plurality of robot controllers; and
    a processor configured to permit input of the operational instruction from the teach pendant into a robot controller among the plurality of robot controllers, in response to the sensor detecting the sign at the at least one robot controlled by said robot controller.

12. The robot system of claim 1, further comprising:
    a network to which the robot controller is connected; and
    a network controller configured to control the network, wherein the teach pendant is configured to communicate with the network controller so as to input the operational instruction into the robot controller.

13. A robot system, comprising:
a robot;
a sensor configured to detect a sign received by the robot;
a robot controller configured to control the robot;
a teach pendant configured to
  communicate with the robot controller, and
  input an operational instruction for the robot into the robot controller;
a processor configured to permit input of the operational instruction from the teach pendant into the robot controller in response to the sensor detecting the sign; and
a storage device storing controller identification information identifying the robot controller, wherein
the processor is configured to
  extract, from the storage device, the controller identification information corresponding to the robot controller for controlling the robot receiving the sign,
  notify the teach pendant of the extracted controller identification information, in response to the sensor detecting the sign, and
  establish communication usable for the input of the operational instruction for the robot receiving the sign, between the teach pendant notified of the controller identification information and the robot controller for controlling the robot receiving the sign.

14. The robot system of claim 13, wherein
the storage device further stores robot identification information identifying the robot, and
the processor is configured to
  extract, from the storage device, the robot identification information corresponding to the robot receiving the sign,
  notify the teach pendant of the extracted robot identification information, in addition to the controller identification information, in response to the sensor detecting the sign, and
  establish the communication between the teach pendant notified of both of the controller identification information and the robot identification information and the robot controller for controlling the robot receiving the sign.

15. The robot system of claim 13, wherein
the teach pendant is configured to identify a partner of the communication with use of an IP address,
the storage device stores, as the controller identification information, a controller IP address assigned to the robot controller, and
the processor is configured to register the controller IP address in the teach pendant to establish the communication.

16. A robot system comprising:
a robot;
a sensor configured to detect a sign received by the robot;
a robot controller configured to control the robot;
a teach pendant configured to
  communicate with the robot controller, and
  input an operational instruction for the robot into the robot controller;
a processor configured to permit input of the operational instruction from the teach pendant into the robot controller in response to the sensor detecting the sign; and
a storage device storing pendant identification information identifying the teach pendant,
wherein the processor is configured to
  extract the pendant identification information from the storage device,
  notify the robot controller for controlling the robot receiving the sign of the extracted pendant identification information, in response to the sensor detecting the sign, and
  establish communication usable for the input of the operational instruction for the robot receiving the sign, between the robot controller notified of the pendant identification information and the teach pendant.

17. The robot system of claim 16, wherein
the robot controller is configured to identify a partner of the communication with use of an IP address,
the storage device stores, as the pendant identification information, a pendant IP address assigned to the teach pendant, and
the processor is configured to register the pendant IP address in the robot controller to establish the communication.

* * * * *